US010744611B2

(12) United States Patent
Nakaya et al.

(10) Patent No.: US 10,744,611 B2
(45) Date of Patent: Aug. 18, 2020

(54) MACHINE TOOL CONTROL DEVICE AND MACHINE TOOL EQUIPPED WITH SAID CONTROL DEVICE

(71) Applicants: Citizen Watch Co., Ltd., Tokyo (JP); Citizen Machinery Co., Ltd., Nagano (JP)

(72) Inventors: Takaichi Nakaya, Nagano (JP); Kazuhiko Sannomiya, Nagano (JP); Hiroshi Shinohara, Nagano (JP)

(73) Assignees: Citizen Watch Co., Ltd., Tokyo (JP); Citizen Machinery Co., Ltd., Nagano (JP)

( * ) Notice: Subject to any disclaimer, the term of this patent is extended or adjusted under 35 U.S.C. 154(b) by 68 days.

(21) Appl. No.: 15/761,595

(22) PCT Filed: Sep. 7, 2016

(86) PCT No.: PCT/JP2016/076233
§ 371 (c)(1),
(2) Date: Mar. 20, 2018

(87) PCT Pub. No.: WO2017/051705
PCT Pub. Date: Mar. 30, 2017

(65) Prior Publication Data
US 2018/0345434 A1    Dec. 6, 2018

(30) Foreign Application Priority Data
Sep. 24, 2015 (JP) .................................. 2015-187072

(51) Int. Cl.
*B23B 1/00* (2006.01)
*B23Q 15/013* (2006.01)
(Continued)

(52) U.S. Cl.
CPC .............. *B23Q 15/013* (2013.01); *B23B 1/00* (2013.01); *G05B 19/4093* (2013.01);
(Continued)

(58) Field of Classification Search
CPC .......... B23Q 1/34; B23Q 5/22; B23Q 15/013; B23Q 15/007; B23B 29/125; B23B 27/22;
(Continued)

(56) References Cited

U.S. PATENT DOCUMENTS 4,789,943 A * 12/1988 Yamanaka ........... G05B 19/186
318/571
5,404,308 A *  4/1995 Kajiyama ............ G05B 19/186
318/568.18
(Continued)

FOREIGN PATENT DOCUMENTS

| JP | 2006312223 A | * | 11/2006 |
| JP | 2006312223 A |   | 11/2006 |
| JP |    5139591 B1 |   |  2/2013 |

OTHER PUBLICATIONS

Berglind L El Al: "Modulated Tool Path (MTP) Machining for Threading Applications:" Procedia Manufacturing vol. 1, 2015, p. 546-555.

*Primary Examiner* — Sara Addisu
(74) *Attorney, Agent, or Firm* — Howson & Howson LLP

(57) ABSTRACT

In a machine tool, under user set conditions, a cutting tool is fed in a feeding direction while the cutting tool is moved repetitively to cut a workpiece smoothly while separating chips easily. In the machine tool and a control apparatus thereof, control means is configured to set the number of rotations of relative rotation for executing machining of a workpiece, and the number of repetitions of repetitive movement during one rotation of the relative rotation in accor- (Continued)

dance with a repetitive movement frequency attributable to a cycle during which an operation instruction can be issued.

6 Claims, 8 Drawing Sheets

(51) Int. Cl.
*G05B 19/4093* (2006.01)
*G05B 19/416* (2006.01)
*B23B 25/02* (2006.01)

(52) U.S. Cl.
CPC ............ *G05B 19/416* (2013.01); *B23B 25/02* (2013.01); *G05B 2219/49055* (2013.01)

(58) Field of Classification Search
CPC ........ B23G 3/00; B24B 1/04; G05B 19/4093; G05B 19/416; G05B 2219/49055
See application file for complete search history.

(56) References Cited

U.S. PATENT DOCUMENTS

| | | | |
|---|---|---|---|
| 6,155,148 A * | 12/2000 | Shinozaki | G05B 19/186 409/66 |
| 7,123,984 B2 * | 10/2006 | Tanaka | B23G 1/02 700/193 |
| 7,508,116 B2 * | 3/2009 | Liu | B23B 29/125 310/317 |
| 2006/0047357 A1 | 3/2006 | Tanaka | |
| 2009/0107308 A1 * | 4/2009 | Woody | B23B 25/02 82/1.11 |
| 2014/0102268 A1 | 4/2014 | Hariki et al. | |
| 2014/0216216 A1 * | 8/2014 | Hessenkamper | B23B 29/125 82/1.11 |

* cited by examiner

FIG.6

| INSTRUCTION CYCLE (s) | REPETITIVE MOVEMENT FREQUENCY f (Hz) |
|---|---|
| 0.004 × 4 | 62.5 |
| 0.004 × 5 | 50 |
| 0.004 × 6 | 41.666 |
| 0.004 × 7 | 35.714 |
| 0.004 × 8 | 31.25 |
| ... | ... |

FIG.8

TABLE OF NUMBER OF ROTATIONS S (r/min) OF SPINDLE CORRESPONDING TO VALUE OF NUMBER OF REPETITIONS N AND VALUE OF REPETITIVE MOVEMENT FREQUENCY f

| | | REPETITIVE MOVEMENT FREQUENCY f (Hz) | | | |
|---|---|---|---|---|---|
| | | 62.5 | 50 | 41.666 | ... |
| NUMBER OF REPETITIONS N OF REPETITIVE MOVEMENT DURING ONE ROTATION OF SPINDLE | 3.5 | 1071.429 | 857.1429 | 714.2743 | ... |
| | 2.5 | 1500 | 1200 | 999.984 | ... |
| | 1.5 | 2500 | 2000 | 1666.64 | ... |
| | 0.5 | 7500 | 6000 | 4999.92 | ... |

MACHINE TOOL CONTROL DEVICE AND MACHINE TOOL EQUIPPED WITH SAID CONTROL DEVICE

FIELD OF THE INVENTION

The present invention relates to a control apparatus of a machine tool that machines a workpiece while sequentially separating chips generated during cutting, and also relates to a machine tool including the control apparatus.

BACKGROUND OF THE INVENTION

A conventionally known machine tool includes: workpiece holding means configured to hold a workpiece; a cutting tool rest configured to hold a cutting tool for cutting the workpiece; feeding means configured to feed the cutting tool toward the workpiece in a predetermined feeding direction by allowing relative movement between the workpiece holding means and the cutting tool rest; repetitive movement means configured to repetitively move the workpiece holding means and the cutting tool rest relative to each other by repeating the relative movement in the feeding direction at first and second speeds different from each other; and rotating means configured to rotate the workpiece and the cutting tool relative to each other. An example of such a machine tool is described in United States Patent Publication No. 2014/0102268, published on Apr. 17, 2014.

A control apparatus of the machine tool is configured to control the rotating means, the feeding means, and the repetitive movement means to drive, and to allow the machine tool to machine the workpiece by the relative rotation between the workpiece and the cutting tool and by the feed movement of the cutting tool toward the workpiece with the repetitive movement in the feeding direction.

The conventional machine tool is configured so that an operation instruction is issued by the control apparatus at a predetermined cycle. Therefore, a repetitive movement frequency at which the workpiece holding means and the cutting tool rest are repetitively moved relative to each other is defined as a limited value attributable to a cycle during which an operation instruction can be issued by the control apparatus. However, the repetitive movement frequency is not considered in the conventional machine tool. Therefore, with respect to any number of rotations of the relative rotation, the repetitive movement may not be performed at any number of repetitions of the repetitive movement of the cutting tool relative to the workpiece during one rotation of the workpiece.

Thus, the present invention is intended to solve the above problem of the prior art. That is, it is an object of the present invention to provide a control apparatus of a machine tool that feeds a cutting tool in a feeding direction while repetitively moving the cutting tool, and that can smoothly cut a workpiece while easily separating chips. It is also an object of the invention to provide a machine tool including the control apparatus.

SUMMARY OF THE INVENTION

According to a first aspect of the present invention, the above problem is solved by a control apparatus of a machine tool, the control apparatus being provided in the machine tool that includes: a cutting tool configured to cut a workpiece; rotating means configured to rotate the cutting tool and the workpiece relative to each other; feeding means configured to feed the cutting tool and the workpiece in a predetermined feeding direction; and repetitive movement means configured to move the cutting tool and the workpiece relative to each other repetitively by repeating relative movement between the cutting tool and the workpiece at first and second speeds different from each other. The control apparatus includes control means configured to allow the machine tool to machine the workpiece by the relative rotation between the cutting tool and the workpiece and by the feed movement of the cutting tool toward the workpiece with reciprocating vibration. The control means is configured to set the number of rotations of the relative rotation for executing machining of the workpiece and the number of repetitions of the repetitive movement during one rotation of the relative rotation in accordance with a repetitive movement frequency attributable to a cycle during which an operation instruction can be issued.

In the control apparatus of the machine tool according to a second aspect of the present invention, in addition to the configuration of the control apparatus of the machine tool described in the first aspect, the repetitive movement means is configured to repetitively move the cutting tool and the workpiece relative to each other in the feeding direction. Thus, the foregoing problem is solved.

In the control apparatus of the machine tool according to a third aspect of the present invention, in addition to the configuration of the control apparatus of the machine tool described in the first or second aspect, the control apparatus of the machine tool includes: setting means configured to set a value of at least one of parameters, the parameters being the number of rotations of the relative rotation for executing machining of the workpiece, the number of repetitions of the repetitive movement during one rotation of the relative rotation, and the repetitive movement frequency; and correction means configured to set an unset parameter to a predetermined value and to correct, on the basis of the predetermined value of the unset parameter, the value of the parameter that is set by the setting means. Thus, the foregoing problem is solved.

In the control apparatus of the machine tool according to a fourth aspect of the present invention, in addition to the configuration of the control apparatus of the machine tool described in any one of the first to third aspects, the first speed is set to be greater than the second speed. Thus, the foregoing problem is further solved.

In the control apparatus of the machine tool according to a fifth aspect of the present invention, in addition to the configuration of the control apparatus of the machine tool described in the fourth aspect, the repetitive movement means is configured to repetitively move the cutting work and the workpiece relative to each other so that a cut portion during the relative movement at the first speed is overlapped with a cut portion during the relative movement at the second speed. Thus, the foregoing problem is further solved.

In the control apparatus of the machine tool according to a sixth aspect of the present invention, in addition to the configuration of the control apparatus of the machine tool described in any one of the third to fifth aspects, the correction means is configured to set the unset parameter to the predetermined value so that the number of rotations and the number of repetitions are inversely related to each other in which a constant is based on the repetitive movement frequency, and to correct the set value of the parameter. Thus, the foregoing problem is further solved.

In the control apparatus of the machine tool according to a seventh aspect of the present invention, in addition to the configuration of the control apparatus of the machine tool described in any one of the third to sixth aspects, the number of rotations is set as the parameter set by the setting means, and the correction means is configured to set the number of repetitions to a plurality of pre-set predetermined values, set the repetitive movement frequency to a predetermined value specifically included in the control apparatus, and correct the value of the number of rotations set by the setting means, on the basis of each of the predetermined values of the number of repetitions and the set repetitive movement frequency. Thus, the foregoing problem is further solved.

In the control apparatus of the machine tool according to an eighth aspect of the present invention, in addition to the configuration of the control apparatus of the machine tool described in any one of the third to sixth aspects, the number of rotations and the number of repetitions are set as the parameters set by the setting means, and the correction means is configured to correct the set number of rotations and the set number of repetitions to respective values of the number of rotations and the number of repetitions, which are set on the basis of the repetitive movement frequency. Thus, the foregoing problem is further solved.

The machine tool according to a ninth aspect of the present invention includes the control apparatus described in any one of the first to eighth aspects. Thus, the foregoing problem is solved.

The control apparatus of the machine tool of the present invention allows the machine tool, under the conditions set by the control means, to feed the cutting tool in the feeding direction while repetitively moving the cutting tool, and the machine tool can smoothly cut the workpiece while separating chips or easily separating chips.

Also, with the control apparatus of the machine tool, the machine tool of the present invention can smoothly cut the workpiece while easily separating chips.

BRIEF DESCRIPTION OF THE DRAWINGS

FIG. 6 is a chart showing the relationship between the instruction cycle and the repetitive movement frequency.

FIG. 8 is a table of the number of rotations corresponding to the number of repetitions and the repetitive movement frequency, which is shown as a variation of correction made by correction means according to the embodiment of the present invention.

DETAILED DESCRIPTION

A control apparatus of a machine tool according to an aspect of the present invention may be embodied in any manner as long as the control apparatus is provided in the machine tool that includes: a cutting tool configured to cut a workpiece; rotating means configured to rotate the cutting tool and the workpiece relative to each other; feeding means configured to feed the cutting tool and the workpiece in a predetermined feeding direction; and repetitive movement means configured to repetitively move the cutting tool and the workpiece relative to each other by repeating relative movement between the cutting tool and the workpiece at first and second speeds different from each other, the control apparatus including control means configured to allow the machine tool to machine the workpiece by the relative rotation between the cutting tool and the workpiece and by the feed movement of the cutting tool toward the workpiece with reciprocating vibration, and as long as the control means is configured to set the number of rotations of the relative rotation for executing machining of the workpiece and the number of repetitions of the repetitive movement during one rotation of the relative rotation in accordance with a repetitive movement frequency attributable to a cycle during which an operation instruction can be issued, whereby under the conditions set by the control means, the machine tool allows the cutting tool to feed in the feeding direction while repetitively moving the cutting tool and smoothly cuts the workpiece while separating chips or easily separating chips.

Figure 1:
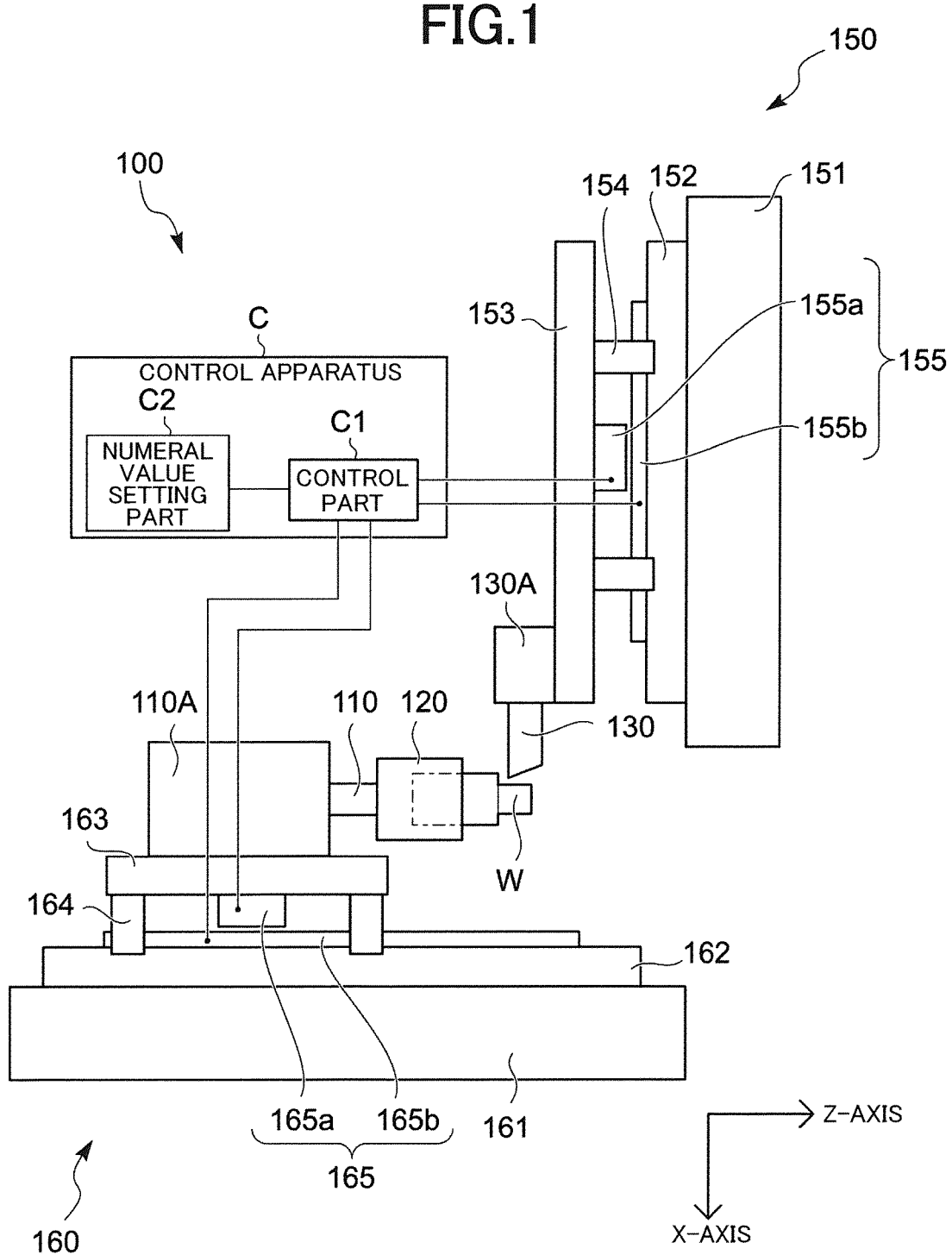
FIG. 1 is a schematic view showing a machine tool according to an embodiment of the present invention.

FIG. 1 is a schematic view showing a machine tool 100 including a control apparatus C according to a first embodiment of the present invention. The machine tool 100 includes a spindle 110 and a cutting tool rest 130A. The spindle 110 is configured as workpiece holding means to hold a workpiece W via a chuck 120. The spindle 110 is supported by a spindle stock 110A so as to be rotatably driven by power from a spindle motor (not shown). A conventionally known built-in motor or the like formed between the spindle stock 110A and the spindle 110 may be used as the spindle motor in the spindle stock 110A.

The spindle stock 110A is mounted on a bed side of the machine tool 100 so as to be movable in a Z-axis direction, which is an axis direction of the spindle 110, by a Z-axis direction feeding mechanism 160. The spindle 110 is configured to be moved via the spindle stock 110A in the Z-axis direction by the Z-axis direction feeding mechanism 160. The Z-axis direction feeding mechanism 160 configures a spindle moving mechanism configured to move the spindle 110 in the Z-axis direction.

The Z-axis direction feeding mechanism 160 includes: a base 161 integral with a fixed side of the Z-axis direction feeding mechanism 160, such as the bed; and a Z-axis direction guide rail 162 provided on the base 161 and extending in the Z-axis direction. A Z-axis direction feeding table 163 is slidably supported by the Z-axis direction guide rail 162 via Z-axis direction guides 164. A mover 165a of a linear servo motor 165 is provided on the side of the Z-axis direction feeding table 163, and a stator 165b of the linear servo motor 165 is provided close to the base 161.

The spindle stock 110A is mounted on the Z-axis direction feeding table 163, and the Z-axis direction feeding table 163 is configured to be movably driven in the Z-axis direction by the linear servo motor 165. The spindle stock 110A is moved in the Z-axis direction according to the movement of the Z-axis direction feeding table 163, thereby moving the spindle 110 in the Z-axis direction.

A cutting tool 130, such as a tool bit configured to cut the workpiece W, is attached to the cutting tool rest 130A. Therefore, the cutting tool rest 130A configures a tool rest that holds the cutting tool 130. An X-axis direction feeding mechanism 150 is provided on the bed side of the machine tool 100.

The X-axis direction feeding mechanism 150 includes: a base 151 integral with the bed side; and an X-axis direction guide rail 152 extending in an X-axis direction, which is orthogonal to the Z-axis direction in an up and down direction. The X-axis direction guide rail 152 is fixed to the base 151, and an X-axis direction feeding table 153 is slidably supported by the X-axis direction guide rail 152 via X-axis direction guides 154. The cutting tool rest 130A is mounted on the X-axis direction feeding table 153.

A linear servo motor 155 includes a mover 155a and a stator 155b. The mover 155a is provided on the X-axis direction feeding table 153, and the stator 155b is provided close to the base 151. When the X-axis direction feeding table 153 is driven by the linear servo motor 155 to move along the X-axis direction guide rail 152 in the X-axis direction, the cutting tool rest 130A moves in the X-axis direction, and thus the cutting tool 130 moves in the X-axis direction. Additionally, a Y-axis direction feeding mechanism may be provided. A Y-axis direction is a direction orthogonal to the shown Z-axis and X-axis directions. The Y-axis direction feeding mechanism may be configured in the same way as the X-axis direction feeding mechanism 150.

The X-axis direction feeding mechanism 150 is mounted on the bed via the Y-axis direction feeding mechanism; whereby, a Y-axis direction feeding table is driven by a linear servo motor to be moved in the Y-axis direction and thus the cutting tool rest 130A can be moved in the Y-axis direction as well as the X-axis direction. Consequently, the cutting tool 130 can be moved in the X-axis direction and the Y-axis direction.

The Y-axis direction feeding mechanism may be mounted on the bed via the X-axis direction feeding mechanism 150 and the cutting table rest 130A may be mounted on the Y-axis direction feeding table.

A tool rest moving mechanism (the X-axis direction feeding mechanism 150 and the Y-axis direction feeding mechanism) and the spindle moving mechanism (the Z-axis direction feeding mechanism 160) operate cooperatively. Accordingly, the cutting tool rest 130A is moved in the X-axis direction by the X-axis direction feeding mechanism 150 and in the Y-axis direction by the Y-axis direction feeding mechanism, and the spindle stock 110A (spindle 110) is moved in the Z-axis direction by the Z-axis direction feeding mechanism 160. Therefore, the cutting tool 130 attached to the cutting tool rest 130A is fed toward the workpiece W in any feeding direction. The rotation of the spindle 110 and the movement of the X-axis direction feeding mechanism 150, the Z-axis direction feeding mechanism 160, or the like are controlled by the control apparatus C.

Figure 2:
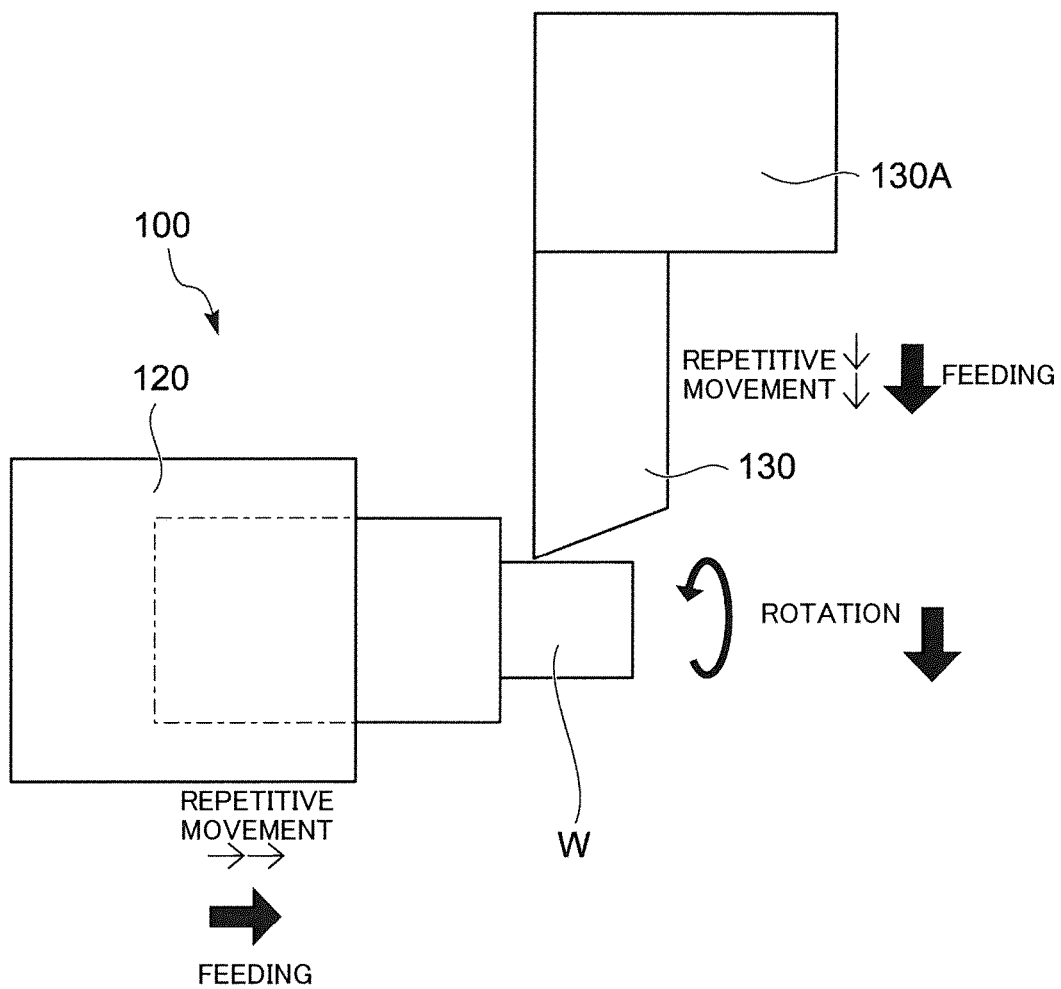
FIG. 2 is a schematic view showing the relationship between a cutting tool and a workpiece according to the embodiment of the present invention.

The spindle 110 and the cutting tool rest 130A are moved relative to each other by feeding means configured by the spindle moving mechanism (the Z-axis direction feeding mechanism 160) and the tool rest moving mechanism (the X-axis direction feeding mechanism 150 and the Y-axis direction feeding mechanism), whereby the cutting tool 130 is fed toward the workpiece W in any feeding direction. Therefore, as shown in FIG. 2, the workpiece W can be cut with the cutting tool 130 into any shape.

In the present embodiment, both the spindle stock 110A and the cutting tool rest 130A are configured to be movable. Alternatively, the spindle stock 110A may be fixed on the bed side of the machine tool 100 so as not to be movable and the tool rest moving mechanism may be configured to move the cutting tool rest 130A in the X-axis direction, the Y-axis direction, and the Z-axis direction. In this case, the feeding means is configured by the tool rest moving mechanism that is configured to move the cutting tool rest 130A in the X-axis direction, the Y-axis direction, and the Z-axis direction, and the feeding means moves the cutting tool rest 130A toward the spindle 110 that is fixedly positioned so as to be rotatably driven. Therefore, the cutting tool 130 can be fed in the feeding direction toward the workpiece W.

Also, the cutting tool rest 130A may be fixed on the bed side of the machine tool 100 so as not to be movable and the spindle moving mechanism may be configured to move the spindle stock 110A in the X-axis direction, the Y-axis direction, and the Z-axis direction. In this case, the feeding means is configured by the spindle moving mechanism that is configured to move the spindle stock 110A in the X-axis direction, the Y-axis direction, and the Z-axis direction, and the spindle stock 110A is moved toward the cutting tool rest 130A that is fixedly positioned. Therefore, the cutting tool 130 can be fed in the feeding direction toward the workpiece W.

Additionally, in the present embodiment, the X-axis direction feeding mechanism 150, the Y-axis direction feeding mechanism, and the Z-axis direction feeding mechanism 160 are each configured to be driven by the linear servo motor but may be driven, for example, by a conventionally known ball screw and a conventionally known servo motor.

Further, in the present embodiment, rotating means for rotating the workpiece W and the cutting tool 130 relative to each other is configured by the spindle motor such as the built-in motor. The spindle 110 is rotatably driven, whereby the workpiece W and the cutting tool 130 are rotated relative to each other. In the present embodiment, the workpiece W is rotatable relative to the cutting tool 130. Alternatively, the cutting tool 130 may be rotatable relative to the workpiece W. In this case, a rotating tool such as a drill may be applied as the cutting tool 130. A control part C1 included in the control apparatus C serves as control means. The rotation of the spindle 110 and driving of the Z-axis direction feeding mechanism 160, the X-axis direction feeding mechanism 150, and the Y-axis direction feeding mechanism are controlled to be driven by the control part C1. The control part C1 is set in advance so that each of the feeding mechanisms as repetitive movement means is controlled to move the spindle stock 110A or the cutting tool rest 130A in respective moving directions while repetitively moving the spindle 110 and the cutting tool 130 relative to each other by repeating relative movement between the spindle 110 and the cutting tool 130 in respective moving directions at a first speed and at a second speed that is different from the first speed and slower than the first speed.

Figure 3:
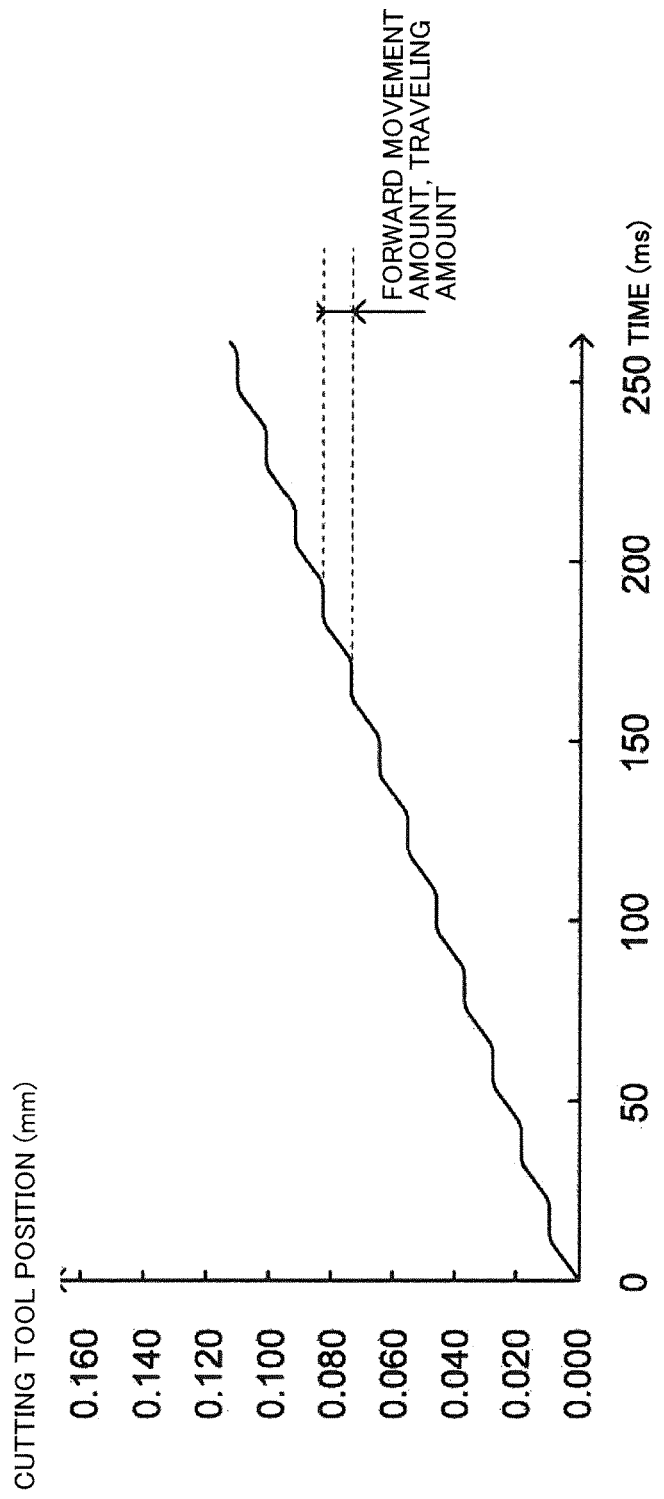
FIG. 3 is a graph showing the repetitive movement and a position of the cutting tool according to the embodiment of the present invention.

Each of the feeding mechanisms is controlled by the control part C1 to, in each repetitive movement, move the spindle 110 or the cutting tool rest 130A forward in each moving direction by a predetermined forward movement amount as the relative movement at the first speed and subsequently stop the spindle 110 or the cutting tool rest 130A in each moving direction as the relative movement at the second speed; therefore, the spindle 110 or the cutting tool rest 130A is moved in each moving direction by a traveling amount, as shown in FIG. 3. As a result, the feeding mechanisms cooperatively operate to feed the cutting tool 130 toward the workpiece W in the feeding direction.

Figure 4:
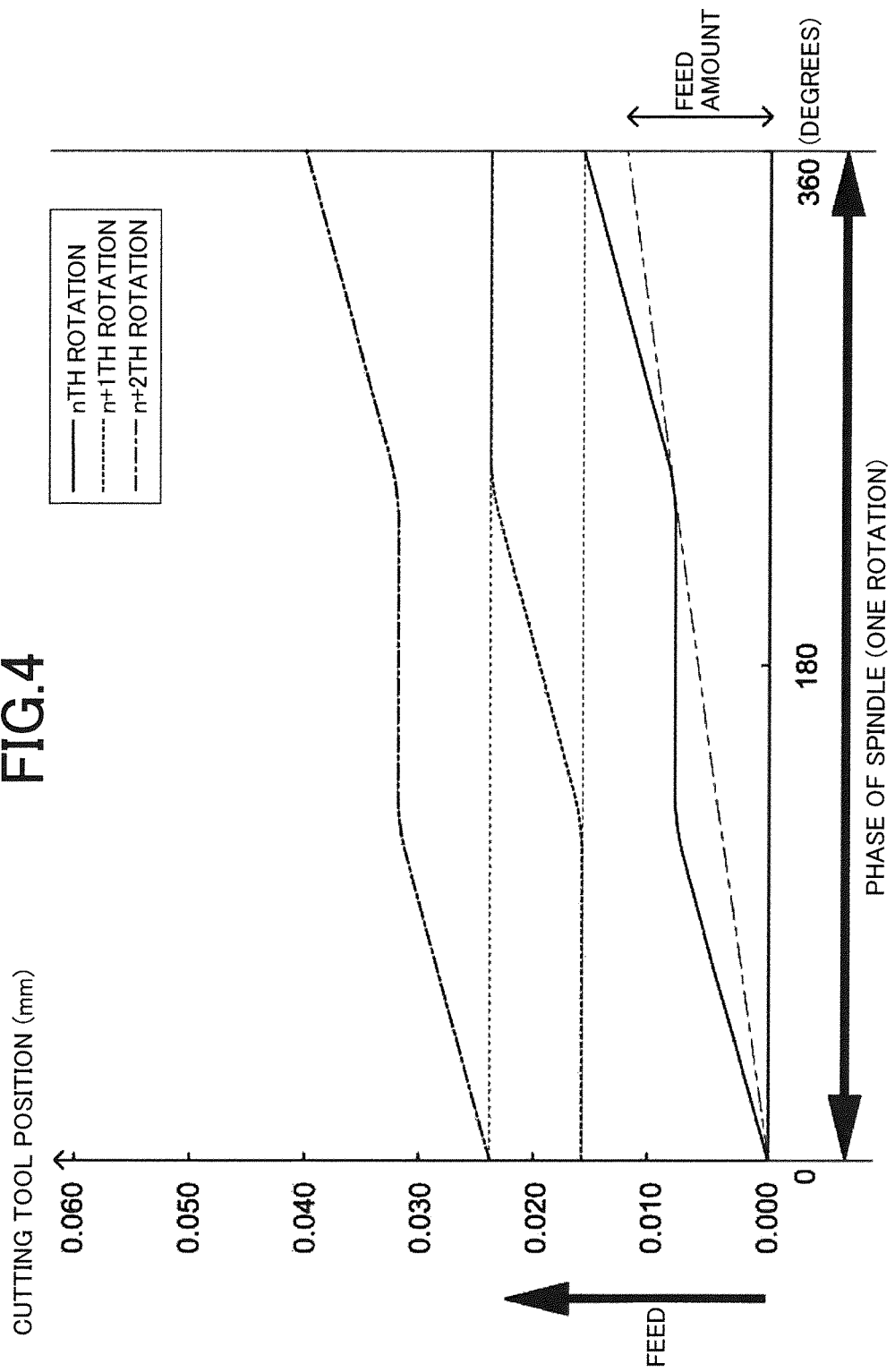
FIG. 4 is a graph showing the relationship among the nth rotation, the n+1th rotation, and the n+2th rotation of a spindle according to the embodiment of the present invention.

As shown in FIG. 4, the machine tool 100 allows the Z-axis direction feeding mechanism 160, the X-axis direction feeding mechanism 150, and the Y-axis direction feeding mechanism to feed the cutting tool 130 in the feeding direction while repetitively moving the cutting tool 130 in the feeding direction by the amount of feed during one rotation of the spindle, i.e., by the amount of feed when the phase of the spindle has changed from 0 degrees to 360 degrees, thereby machining the workpiece W.

The spindle stock 110A (spindle 110) or the cutting tool rest 130A (cutting tool 130) repetitively moves in a state where the workpiece W is rotating and the outline of the workpiece W is cut into the predetermined shape with the cutting tool 130. In such a case, a circumferential surface of the workpiece W is cut into a curved line along a waveform generated in the repetitive movement. On an imaginary line (an alternate long and short dash line) passing the bottom of a waveform, the amount of change in position when the phase of the spindle has changed from 0 degrees to 360 degrees indicates the amount of feed. As shown in FIG. 4, a case where the number of repetitions N of the repetitive movement of the spindle stock 110A (spindle 110) or the cutting tool rest 130A during one rotation of the workpiece W is 1.5 (the number of repetitions of the repetitive movement during one rotation N=1.5) will be described as an example.

In this case, the phase of the shape of the circumferential surface of the workpiece W cut with the cutting tool 130 during the n+1th rotation of the spindle 110 (n is an integer equal to or larger than 1) is shifted from the phase of the shape of the circumferential surface of the workpiece W cut with the cutting tool 130 during the nth rotation of spindle 110 in a spindle phase direction (a horizontal axis on the graph). Therefore, the position of the bottom of the phase (an upwardly protruding portion of a curved line on a dotted-line waveform graph in FIG. 4 when the relative movement at the first speed shifts to the stop at the second speed, i.e., zero speed) during the n+1th rotation is shifted from the position of the bottom of the phase (an rising portion of a curved line on a solid waveform graph in FIG. 4) during the nth rotation in the spindle phase direction.

As a result, in a location of the circumferential surface of the workpiece W, a distance between a path (the solid waveform graph) traced by the cutting tool 130 during nth rotation and a path (the dotted-line waveform graph) traced by the cutting tool 130 during the n+1th rotation may be shortened. In such a location, the width of chips generated from the workpiece W is small, and therefore the chips are easily broken and separated.

Figure 5:
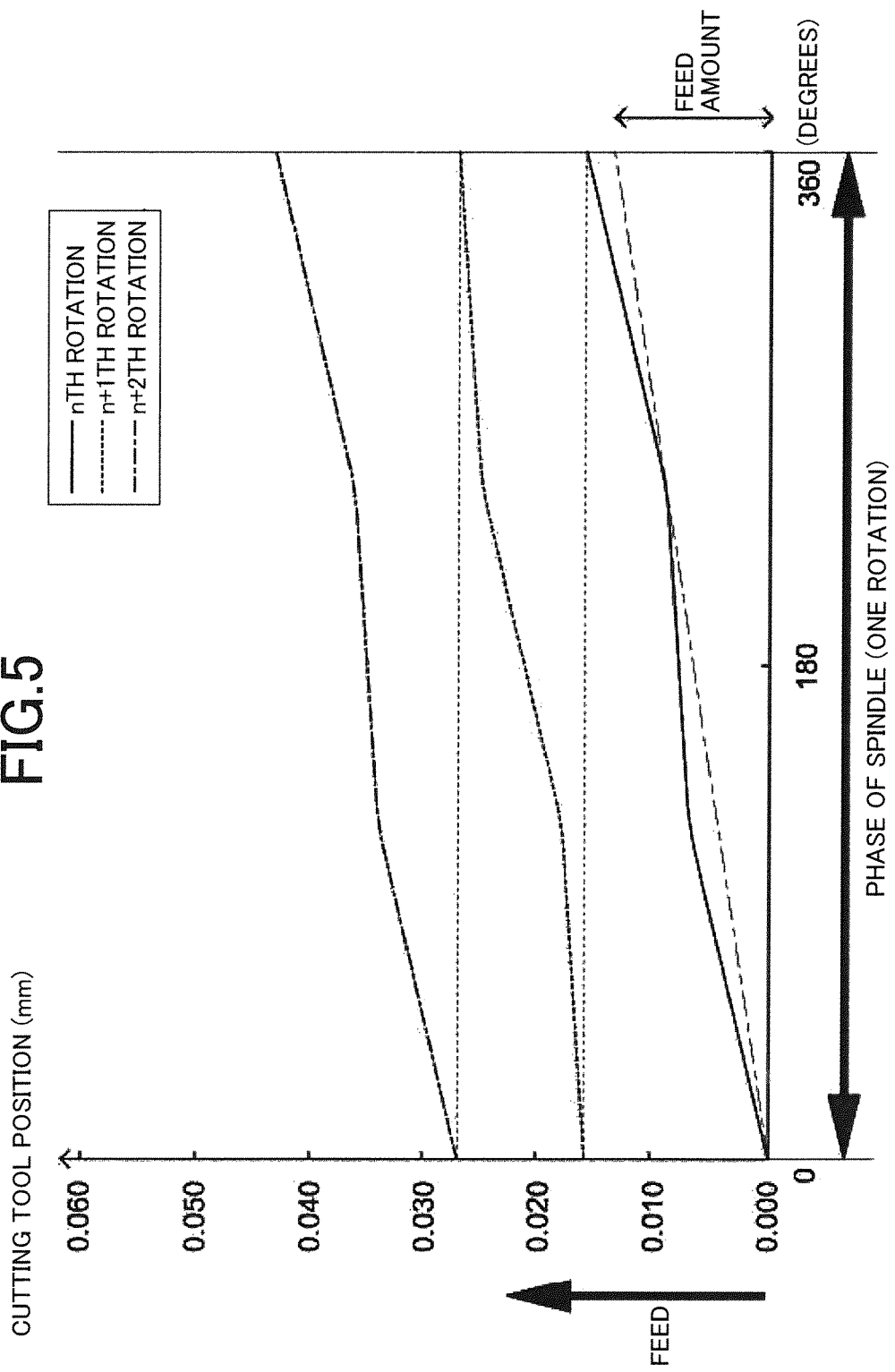
FIG. 5 is a graph showing a modified example of the waveforms of the repetitive movement shown in FIG. 4.

Also, the relative movement at the first speed as the forward movement in FIG. 4, and instead of the stop in FIG. 4 as the relative movement at the second speed, a movement at a speed slower than the first speed in the same direction as the movement at the first speed in the feeding direction, may be repeated, as shown in FIG. 5. Accordingly, compared to the repetitive movement shown in FIG. 4, the amount of feed is increased and therefore the cutting efficiency can be increased.

As shown in FIG. 5, in the same way as in FIG. 4, in a location of the circumferential surface of the workpiece W, a distance between a path (the solid waveform graph) traced by the cutting tool 130 during nth rotation and a path (the dotted-line waveform graph) traced by the cutting tool 130 during the n+1th rotation may be shortened. In such a location, the width of chips generated from the workpiece W is small, and therefore the chips are easily broken and separated. As described above, regarding the repetitive movement by the repetitive movement means of the present invention, the second speed in the feeding direction may be zero, or the relative movement at the second speed may be performed in the same direction as the relative movement at the first speed. Alternatively, reciprocating vibration may be performed in the feeding direction by repeating the relative movement at the first speed and the relative movement at the second movement in the opposite direction from the direction of the relative movement at the first speed.

In the case of such a reciprocating vibration, the control part C1 performs control so that a path traced by the cutting tool 130 on the circumferential surface of the workpiece W at the time of the backward movement (the relative movement at the second speed) during the n+1th rotation reaches a path traced by the cutting tool 130 on the circumferential surface of the workpiece W during the nth rotation. Therefore, a cut portion during the relative movement at the first speed can be in contact with a cut portion during the relative movement at the second speed, that is, these cut portions can be partially overlapped with each other. Thus, in each repetitive movement, a cut portion during the relative movement of the cutting tool 130 at the second speed is included theoretically as a "point" in a cut portion during the relative movement of the cutting tool 130 at the first speed. In the "point", the cutting tool 130 separates from the workpiece W during the relative movement at the second speed, that is, the cutting tool 130 performs an "air cut". As a result, chips generated from the workpiece W during the cutting work are sequentially separated by the air cut (in the point in which the cut portion during the relative movement at the first speed is in contact with the cut portion during the relative movement at the second speed).

In addition, regarding the relationship between the nth rotation and the n+1th rotation, the phase of the shape of the circumferential surface of the workpiece W cut with the cutting tool 130 during the n+1th rotation simply needs to be non-coincident with (not the same as) the phase of the shape of the circumferential surface of the workpiece W cut with the cutting tool 130 during the nth rotation of the workpiece W, and does not need to be a 180-degree inversion of the phase of the shape of the circumferential surface of the workpiece W cut with the cutting tool 130 during the nth rotation of the workpiece W. For example, the number of repetitions N of the repetitive movement during one rotation may be 1.1, 1.25, 2.6, 3.75, or the like. Alternatively, the number of repetitions N of the repetitive movement may be set so that the number of repetitions of the repetitive movement generated during one rotation of the workpiece W may be smaller than 1 (0<the number of repetitions N<1.0). Accordingly, the spindle 110 rotates one rotation or more for each repetitive movement (the number of repetitions of the repetitive movement is 1 for a number of rotations).

In the machine tool 100, an operation instruction is issued by the control part C1 at a predetermined instruction cycle. The repetitive movement of the spindle stock 110A (spindle 110) or the cutting tool rest 130A (cutting tool 130) can be performed at a predetermined frequency based on the instruction cycle. For example, if the machine tool 100 is configured such that 250 instructions per second can be issued by the control part C1, the operation instruction is issued by the control part C1 at a cycle of 4 ms (equivalent to 1/250), which is a reference cycle.

The instruction cycle is defined based on the reference cycle and is generally the integral multiple of the reference cycle. The repetitive movement can be performed at a frequency according to a value of the instruction cycle. As shown in FIG. 6, for example, when 16 ms which is the quadruple of the reference cycle of 4 ms is defined as the instruction cycle, the relative movement at the first speed and the relative movement at the second speed are performed every 16 ms. Thus, the spindle stock 110A (spindle 110) or the cutting tool rest 130A (cutting tool 130) can repetitively move at a frequency of 62.5 Hz equivalent to 1/(0.004×4).

Alternatively, the spindle stock 110A (spindle 110) or the cutting tool rest 130A (cutting tool 130) can repetitively move only at plural predetermined discrete frequencies of 50 Hz equivalent to 1/(0.004×5), 41.666 Hz substantially equivalent to 1/(0.004×6), 35.714 Hz substantially equivalent to 1/(0.004×7), 31.25 Hz equivalent to 1/(0.004×8), or the like.

The repetitive movement frequency f (Hz) as a vibration frequency at which the spindle stock 110A (spindle 110) or the cutting tool rest 130A (cutting tool 130) repetitively moves is defined as a value selected from the frequencies described above. Also, the control apparatus C (control part C1) can set the instruction cycle by multiplying the reference cycle (4 ms) by any multiple number other than integral numbers. In this case, a frequency according to such an instruction cycle can be applied as the repetitive movement frequency f.

Figure 7:
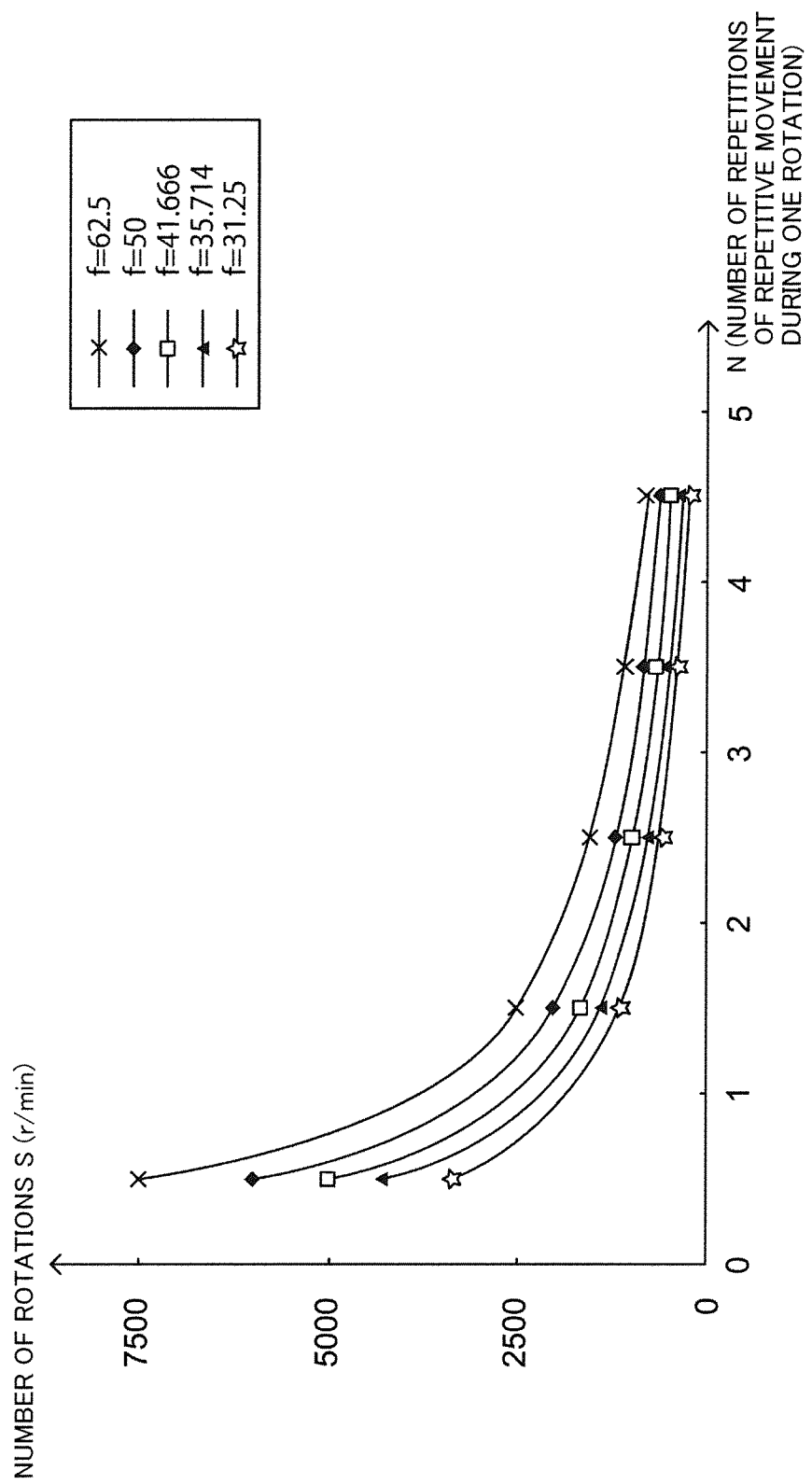
FIG. 7 is a graph showing the relationship among the number of repetitions of the repetitive movement during one rotation of a spindle according to the embodiment of the present invention, the number of rotations, and the repetitive movement frequency.

When the number of rotations S of the spindle 110 is defined as S (r/min) in the case of repetitive movement of the spindle stock 110A (spindle 110) or the cutting tool rest 130A (cutting tool 130), the number of repetitions N of the repetitive movement during one rotation is defined as N=f×60/S. As shown in FIG. 7, the number of rotations S and the number of repetitions N are inversely related to each other in which the repetitive movement frequency f is a constant. The spindle 110 can rotate at higher speed when the repetitive movement frequency f has a higher value or when the number of repetitions N has a smaller value.

In the machine tool 100 according to the present embodiment, the number of rotations S, the number of repetitions N, and the repetitive movement frequency f are set as parameters, and a user can set the number of rotations S and the number of repetitions N of the three parameters via a numeral value setting part C2 or the like to the control part C1. In order to set the number of rotations S or the number of repetitions N to the control part C1, a value of the number of rotations S or the number of repetitions N can be input as a parameter value into the control part C1. Also, for example, a value of the number of rotations S or the number of repetitions N may be written in a machining program. Alternatively, the number of repetitions N may be set as an argument in a program block (on one line in the program).

When setting means is configured such that the number of repetitions N can be particularly set as an argument in the program block of the machining program, the user can easily set the number of rotations S and the number of repetitions N from the machining program with the number of rotations S of the spindle 110, which is generally written on the machining program and the number of repetitions N, which is written as the argument in the program block. Also, setting by the setting means may be performed through a program or may be performed by the user via the numeral value setting part C2.

Also, a circumferential speed and a workpiece diameter can be set and inputted via the machining program or the like, and the number of rotations S can be calculated and set on the basis of the circumferential speed and the workpiece diameter. The setting means is configured to calculate the number of rotations S on the basis of the circumferential speed and the workpiece diameter that are set and inputted via the machining program or the like; thereby, the user can unintentionally and easily set the number of rotations S according to the circumferential speed that is defined based on the material of the workpiece W or based on the type, shape, material, or the like of the cutting tool 130.

The control part C1 controls, on the basis of the set number of rotations S and the set number of repetitions N, the spindle stock 110A or the cutting tool rest 130A to repetitively move so that the spindle 110 is rotated at the set number of rotations S and so that the cutting tool 130 is fed in the feeding direction while repetitively moving at the set number of repetitions N in the feeding direction.

Also, the number of rotations S and the number of repetitions N are defined based on the repetitive movement frequency f as described above; therefore, the control part C1 includes correction means configured to correct the set number of rotations S and the set number of repetitions N on the basis of the repetitive movement frequency f. The correction means sets the repetitive movement frequency f on the basis of N=60f/S so that the repetitive movement frequency f has a value near a value calculated from the set number of repetitions N and the set number of rotations S, and the correction means can correct the number of repetitions N and the number of rotations S with the set repetitive movement frequency f to values near their respective set values.

For example, the number of rotations and the number of repetitions are respectively set by the user at S=3000 (r/min) and N=1.5. In this case, a value of the repetitive movement frequency of 75 Hz is derived from S=3000 (r/min) and N=1.5. Therefore, the correction means sets the repetitive movement frequency f, for example, at 62.5 Hz. Thus, the correction means may correct the number of repetitions N to 1.25 on the basis of the set repetitive movement frequency f (62.5 Hz) while, for example, maintaining the number of rotations S (3000 r/min). Alternatively, the correction means may correct the number of rotations S to 2500 r/min on the basis of the set repetitive movement frequency f (62.5 Hz) while, for example, maintaining the number of repetitions N (1.5). Also, the repetitive movement frequency f is set at 50 Hz and thereby the number of rotations S and the number of repetitions N can be corrected to 2400 r/min and 1.25, respectively.

Under the condition based on the number of repetitions N and the number of rotations S, which are set by the setting means, with the correction of the number of rotations S and the number of repetitions N by the correction means, the machine tool 100 is configured to allow the Z-axis direction feeding mechanism 160, the X-axis direction feeding mechanism 150, and the Y-axis direction feeding mechanism to feed the cutting tool 130 in the feeding direction while repetitively moving the cutting tool 130 in the feeding direction and smoothly cuts the workpiece W while separating chips or easily separating chips. In some cases, for example, the life-span of the cutting tool 130 can be extended. Thus, the workpiece W can be machined under the condition relatively close to the number of rotations S and the number of repetitions N, which are intended by the user.

In any of such cases, in accordance with machining conditions, one of the number of rotations S and the number of repetitions N is corrected in priority to the other of the number of rotations S and the number of repetitions N or both the number of rotations S and the number of repetitions N are corrected; thereby, the correcting conditions can be changed. Alternatively, the user sets in advance the repetitive movement frequency f used by the setting means and then the number of repetitions N or the number of rotations S can be corrected in accordance with the set repetitive movement frequency f.

In this case, in a state where the control part C1 is in a stable control mode, the cutting tool 130 is fed in the feeding direction while being repetitively moved in the feeding direction and can smoothly and stably cut the outline of the workpiece W while separating chips or while easily separating chips.

Also, in order to reduce the machining cycle time, the spindle 110 is desirably set so as to rotate at high speed as much as possible. In order to allow the spindle 110 to rotate at high speed, it is necessary to set the repetitive movement frequency f high as much as possible; however, it is not easy in terms of stable control or the like to set the repetitive movement frequency f higher than necessary. Accordingly, the number of repetitions N is set low as much as possible and thereby the number of rotations S can be set high as much as possible.

In this case, the setting means is configured to set the number of repetitions N as the number of rotations S of the spindle 110 for each repetitive movement. Thereby, the setting of increasing the number of rotations S can be performed easily. The number of rotations S of the spindle 110 for each repetitive movement is set to 1 or more and the number of repetitions N is set to a value larger than 0 and smaller than. Thereby, the spindle 110 can rotate at high speed. It is noted that since the length of each chip to be separated is relatively long, the number of repetitions N needs to be set so as not to affect the cutting work adversely.

In the present embodiment, of the three parameters, the number of repetitions N or the number of rotations S is set via the numeral value setting part C2 or the like to the control part C1. Alternatively, for example, the number of repetitions N is fixed in advance at a predetermined value so as to avoid the necessity of inputting, and only the number of rotations S is set by the user as one of the three parameters. Then, the repetitive movement frequency f is set according to the fixed number of repetitions N and the set number of rotations S; thereby, the number of repetitions N or the number of rotations S may be corrected in accordance with the set repetitive movement frequency f.

Also, if only the number of rotations S is set by the user as one of the three parameters, the control part C1 may be configured to calculate, with respect to the set number of rotations S, the number of vibrations, which corresponds to each repetitive movement frequency, per repetitive movement frequency, and to set the number of repetitions N at which chips are separated via the reciprocating vibration of the cutting tool 130, without correcting the set number of rotations S. In this case, with respect to the number of rotations S set by the user, the control part C1 performs the reciprocating vibration of the cutting tool 130 at the repetitive movement frequency f, which corresponds to the number of repetitions N set by the control part C1. However, if it is difficult to set the number of repetitions N at which chips are separated as described above according to the user-set number of rotations S or the user-set operable repetitive movement frequency, the control part C1 may be configured to set the amplitude of the reciprocating vibration adjustably at a value that allows chips to be separated.

Also, the correction means of the control part C1 may be configured to correct the set number of rotations S on the basis of the repetitive movement frequency f. As shown in FIG. 8, the control part C1 includes a table of the number of rotations S11, S12, S13 . . . , S21 . . . , S31 . . . of the spindle 110, which corresponds to the number of repetitions N1, N2, N3 . . . of repetitive movement during one rotation of the spindle and the repetitive movement frequency f1, f2, f3 . . . attributable to a cycle during which the operation instruction can be issued, and the correction means may correct a value of the user set number of rotations S to any of the values of the number of rotations S in the table.

The invention claimed is:

1. A machine tool that includes:
   a cutting tool configured to cut a workpiece;
   rotating means configured to rotate at least one of the cutting tool and the workpiece;
   feeding means configured to feed at least one of the cutting tool and the workpiece relative to the other in a predetermined feeding direction;
   repetitive movement means configured to repetitively move at least one of the cutting tool and the workpiece relative to the other by repeating movement along said predetermined feeding direction at first and second speeds in each repetition, said first and second speeds being different from each other; and
   a control apparatus, wherein:
   the control apparatus comprises a control part configured to allow the machine tool to machine the workpiece by the rotation of at least one of the cutting tool and the workpiece and by repetitive relative movement of the cutting tool and the workpiece toward each other;
   the control part is configured to control the movement at said first and second speeds in each repetition by controlling feeding movement of at least one of the cutting tool and the workpiece relative to the other along said predetermined feeding direction by said feeding means; and
   the control part is configured to set the number of rotations of at least one of the cutting tool and the workpiece for executing machining of the workpiece, and the number of repetitions of the repetitive movement during one rotation in the rotation of at least one of the cutting tool and the workpiece, in a relation where the number of rotations and the number of repetitions are inversely related to each other by a constant, said constant being a repetitive movement frequency at which the repetitive relative movement can be performed based on a cycle during which an operation instruction by which the feeding means are controlled to be driven can be issued.

2. The machine tool according to claim 1, wherein the control apparatus further comprises a numeral value setting part, wherein:
   the numeral value setting part is configured to set a value of at least one of parameters from the group consisting of the number of rotations of the rotation of at least one of the cutting tool and the workpiece for executing machining of the workpiece, the number of repetitions of the repetitive movement during one rotation in the rotation of at least one of the cutting tool and the workpiece, and the repetitive movement frequency; and
   the control part is configured to set the remaining parameters yet to be set by the numeral value setting part to a predetermined value and to correct, in dependence on the predetermined value of the remaining parameters, the value of said at least one of the parameters that is set by the numeral value setting part.

3. The machine tool according to claim 1, wherein the first speed is set to be greater than the second speed.

4. The machine tool according to claim 2, wherein the control part is configured to set the remaining parameters yet to be set by the numeral value setting part to the predetermined value so that the number of rotations and the number of repetitions are inversely related to each other by a constant based on the repetitive movement frequency, and to correct the value of said at least one of the parameters.

5. The machine tool according to claim 2, wherein:
the number of rotations is set as said at least one of the parameters; and
the control part is configured to set the number of repetitions to a plurality of pre-set predetermined values, set the repetitive movement frequency to a predetermined value specifically included in the control apparatus, and correct the value of the number of rotations set by the numeral value setting part, on the basis of each of the predetermined values of the number of repetitions and the set repetitive movement frequency.

6. The machine tool according to claim 2, wherein:
the number of rotations and the number of repetitions are set as said at least one of the parameters; and
the control part is configured to determine the repetitive movement frequency on the basis of a value calculated according to the number of rotations and the number of repetitions set by the numeral value setting part and correct the value of the number of rotations or the number of repetitions set by the numeral value setting part to a predetermined value on the basis of the repetitive movement frequency determined by the control part.

* * * * *